UNITED STATES PATENT OFFICE.

SETH L. COLE, OF BROOKLYN, NEW YORK.

IMPROVEMENT IN THE PRODUCTION OF TURPENTINE FROM SAWDUST.

Specification forming part of Letters Patent No. 145,151, dated December 2, 1873; application filed July 5, 1873.

*To all whom it may concern:*

Be it known that I, SETH L. COLE, of the city of Brooklyn, in the county of Kings and State of New York, have invented a certain novel and useful Process for Obtaining Spirits of Turpentine and the Resinous Matter Contained in Sawdust without scorching or charring the same, thereby utilizing a heretofore comparatively useless article, of which the following is a specification:

In order that the public may fully understand the nature of my said new process, I will describe in what manner the same is to be effected, to wit:

In the first place, it is a well-known fact that sawdust obtained from pine wood cannot be brought in contact with the direct heat of the fire in a closed vessel, or otherwise, in a dry state, without burning the same. Therefore I employ a suitable steam-tight cylinder of sufficient capacity, longitudinally arranged to receive a small tramway or railroad-track upon the inside thereof, upon which I place one or more cars containing open metallic baskets filled with sawdust as taken from the mill. I next hermetically seal up the joints of the steam chamber or cylinder with any suitable luting, to make it perfectly steam-tight; then admit a jet of steam, at a high temperature, into the cylinder, which dissolves and forces all the resinous and volatile substance out of the sawdust upon the cars without burning the same. The volatile portion passes off with the escaping steam, through an escape-pipe with cut-off cock, to any suitable condenser, while the resinous matter falls upon the bottom of the steam-chamber, where it remains in liquid form until it is drawn off for use; and if any volatile matter should remain in it, I would redistill it, and the residuum will be rosin.

I am well aware that my original patents, Nos. 38,560 and 40,737, bearing date May 19, 1863, and December 1, 1863, fully cover the process of producing spirits of turpentine from pine wood by destructive distillation, by the application of fire direct upon the retort containing blocks of pine wood, (not sawdust;) consequently the novelty of this present application is confined to the utilization of sawdust, or wood in a powdered state, for producing spirits of turpentine, thereby converting a comparatively worthless substance into a well-known article of commerce by means of any suitable steam apparatus. Therefore I disclaim SETH L. COLE's patents of 1863; also, Duane Hull's patents of September 20, 1864, and June 27, 1865, A. H. Emery's, January 31, 1865, and T. A. Pastorell's, 1866; but

What I claim as new and useful, and wish to protect by Letters Patent of the United States, is—

Utilizing sawdust in the manner and for the specific purpose set forth.

In testimony whereof I hereunto subscribe my name in the presence of two witnesses.

SETH L. COLE.

Witnesses:
 J. P. McLEAN,
 ANNE S. McLEAN.